Patented Dec. 25, 1951

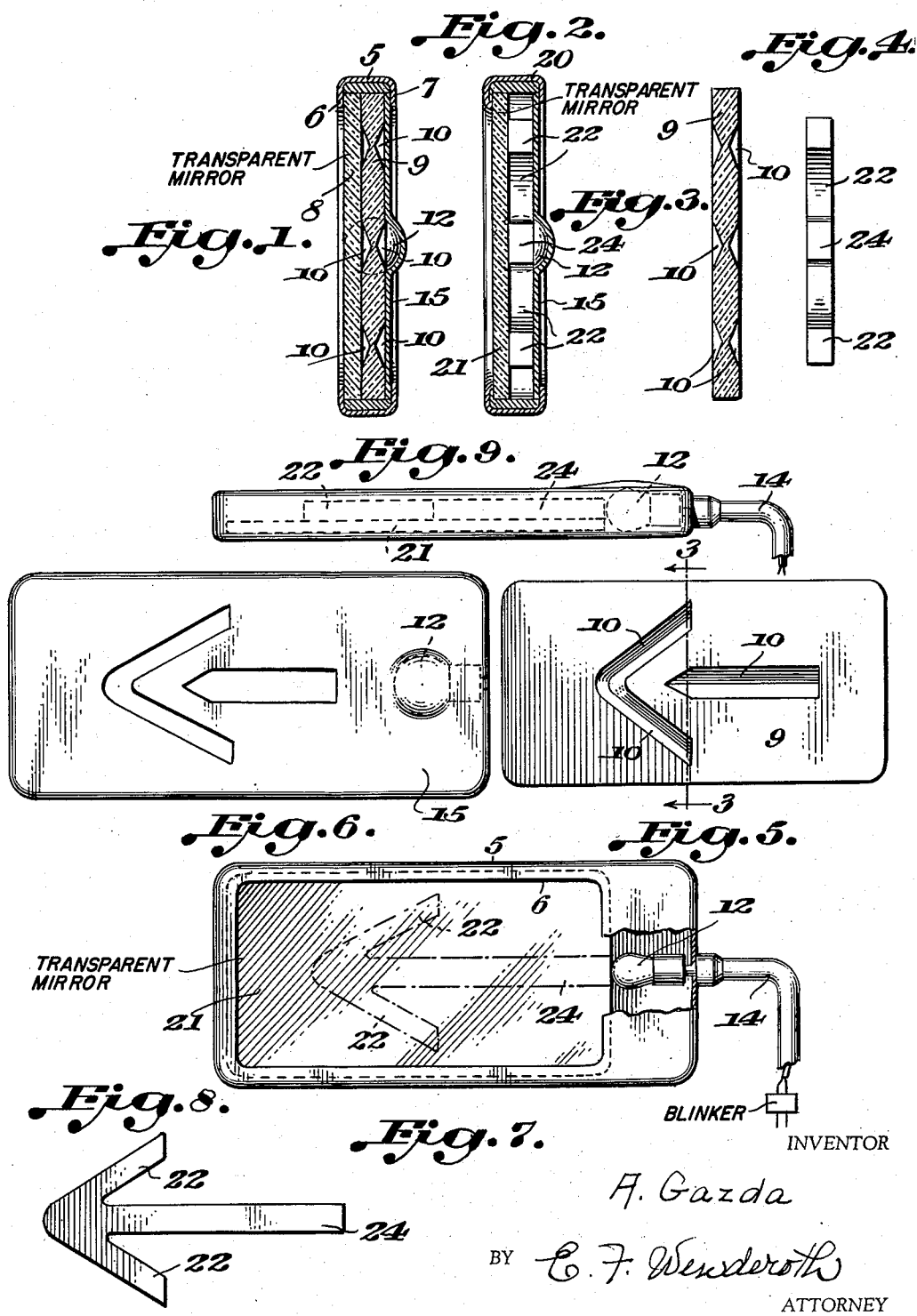

2,580,014

UNITED STATES PATENT OFFICE 2,580,014

COMBINED REARVIEW MIRROR AND DIRECTION INDICATING DEVICE

Antoine Gazda, Providence, R. I.

Application September 13, 1949, Serial No. 115,532

5 Claims. (Cl. 177—329)

1

This invention relates to a direction signalling device combined with a rear view mirror and the like.

An object of the present invention is to provide a direction signalling device wherein the light ray is guided through the use of Lucite or similar materials combined with a transparent rear view mirror.

A further object of the invention is to provide a construction wherein the arrow direction indicating means is constructed from Lucite and the like or is constructed on a sheet of Lucite or the like by providing recesses therein whereby the direction indicating means may be illuminated.

With the above and other objects in view which will become apparent from the detailed description below the invention is shown in the drawings wherein:

Fig. 1 is a cross-sectional view of one form of the invention,

Fig. 2 is a cross-sectional view of another form of the invention,

Fig. 3 is a cross-sectional view of the Lucite member taken upon section line 3—3 of Fig. 5.

Fig. 4 is an end view of the Lucite indicating member shown in Fig. 8,

Fig. 5 is an elevational view of the Lucite plate showing the recesses cut therein, Fig. 6 is a rear elevational view illustrating the invention as it appears to an observer from the rear of a vehicle, Fig. 7 is a rear elevational view similar to Fig. 6 of the form of the invention as shown in Figs. 2 and 4, Fig. 8 is an elevational view of an indicating device constructed of Lucite and the like which is visible from both front and rear of a vehicle, Fig. 9 is a top view of the construction shown in Fig. 7.

In the drawings similar reference characters indicate like parts.

Referring first to the construction shown in Figs. 1, 3, 5 and 6 the construction comprises a frame member 5 with side flanges 6 and 7. Located within the frame is a transparent mirror 8 and associated therewith is a plate 9 of Lucite and the like. The plate 9 is provided on each side thereof as shown particularly in Fig. 3 with a recessed indicating device 10.

A light bulb 12 is located at the edge of the Lucite member 9 as indicated in Fig. 6 and such light bulb is connected to an appropriate supply of electrical current through a bracket member such as 14 shown in Fig. 7 which in turn is connected in any desired way to the vehicle. A plate

2

15 may be disposed over the light bulb or such portion 15 may be integral with the casing 5.

When the edge of the Lucite is illuminated then the indicating indicia 10 will be illuminated in well known manner and will appear visible both in front of the vehicle and also at the rear thereof through the transparent mirror 8. A blinker not shown, is ordinarily associated with the bulb 12 so that the indicating arrow is intermittently flashed.

In the form of the invention shown in Figs. 2, 4, 7, 8 and 9 a frame 20 is provided in which is mounted a transparent mirror 21. The mirror 21 serves as the rear view mirror for the operator of the vehicle and in front thereof is secured in any desired manner a Lucite arrow indicating member 22 as shown particularly in elevation in Fig. 8. A light bulb 12 is also associated with the Lucite member 22 and such bulb is located closely adjacent the end 24 of the arrow 22. When the bulb 12 is illuminated the light rays will strike the Lucite member 22 and will illuminate the entire arrow. Such arrow is then visible from both the front and rear of the vehicle. From the front end the arrow itself is visible while from the rear end the illuminated arrow appears through the transparent mirror 21.

Various modifications may be made in the structure described above and it is intended to claim all modifications as fall within the spirit of the claims.

I claim:

1. A combined signalling and rear view mirror comprising a frame, said mirror being transparent and located in said frame, a Lucite directional indicating member secured to said mirror and illuminating means for illuminating said Lucite member.

2. A combined signalling and rear view mirror comprising a frame, said mirror being transparent and located in said frame, a Lucite directional indicating member secured to said mirror, illuminating means for illuminating said Lucite member, and means for intermittently operating said illuminating means.

3. A combined signalling and rear view mirror for vehicles and the like comprising a frame, said mirror being transparent and positioned in said frame, a Lucite plate positioned adjacent said mirror having recesses therein outlining a direction indication and means for illuminating said recesses whereby said direction indication is visible from both the front and rear of a vehicle.

4. A combined signalling mirror comprising a frame, said signalling mirror being transparent and positioned in said frame, a Lucite plate in contact with the rear of said mirror, said Lucite plate having a directional indicating index thereon and means for illuminating said index.

5. A combined signalling mirror comprising a frame, said mirror being transparent and positioned in said frame, a Lucite plate in contact with the rear of said mirror, said Lucite plate having a directional indicating index thereon and means at one side of said Lucite plate for illuminating said index whereby said index is visible from both sides of said mirror.

ANTOINE GAZDA.

REFERENCES CITED

The following references are of record in the file of this patent:

UNITED STATES PATENTS

| Number | Name | Date |
| --- | --- | --- |
| 1,268,895 | Thomas | June 11, 1918 |
| 2,295,176 | Kelly | Sept. 8, 1942 |
| 2,338,748 | Watkins | Jan. 11, 1944 |